Figure 1:
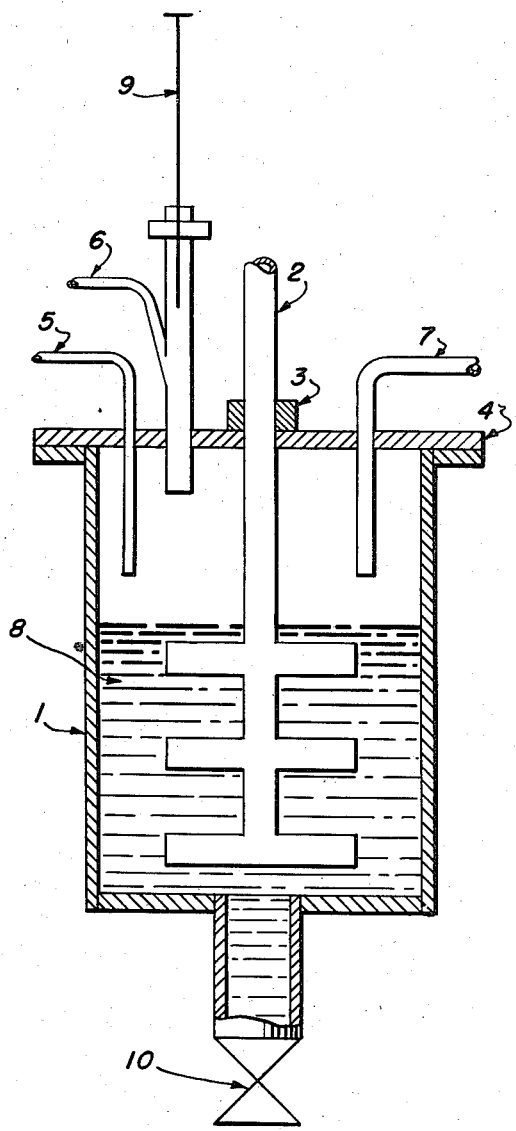

INVENTOR
*JAMES PATERSON QUIN*

United States Patent Office 2,827,371
Patented Mar. 18, 1958

2,827,371

METHOD OF PRODUCING TITANIUM IN AN AGITATED SOLIDS BED

James Paterson Quin, Widnes, England, assignor to Imperial Chemical Industries Limited, a corporation of Great Britain Application October 31, 1952, Serial No. 317,855

Claims priority, application Great Britain November 1, 1951

13 Claims. (Cl. 75—26)

This invention relates to the manufacture of metals and more particularly to the manufacture of titanium by the reduction of a titanium halide.

It is known that metallic titanium may be produced by reducing a titanium halide, preferably titanium tetrachloride, with a metal and one suitable method of manufacture is the reduction of titanium tetrachloride with magnesium at a temperature of approximately 700°–750° C.

As in the case of reduction of titanium tetrachloride by alkali metals or alkaline earth metals so in the case of reduction by magnesium the reaction is strongly exothermic and the heat thus liberated is sufficient to melt the metallic chloride produced in the reaction and also to sinter to some extent the metallic titanium produced forming a sponge. When this happens and the mass is cooled after the reaction solidification occurs and the desired titanium is largely obtained embedded in a mass of solidified chloride which adheres strongly to the reaction vessel. It is therefore difficult to recover the metallic titanium sponge and for removal of the metal from the reaction vessel for subsequent processing mechanical operations such as drilling or cutting are usually necessary. It will be apparent that these mechanical operations also preclude the carrying out of a continuous process.

We have now found that the above-mentioned difficulties in the manufacture of titanium can be largely if not completely avoided in a very convenient manner by reacting titanium tetrachloride with metallic sodium at a temperature between about 200° C. and the melting point of sodium chloride and preferably at a temperature of about 480°–620° C. while agitating the reaction products. By operating in this manner we have found that it is possible to avoid sintering of the reaction products, titanium powder and sodium chloride and these may be obtained in a non-adherent form which is readily removable from the reaction vessel thereby making it possible for us to operate in a continuous manner.

According to the present invention therefore a process for the manufacture of metallic titanium comprises reacting titanium tetrachloride with sodium in an inert atmosphere at a temperature between 200° C. and the melting point of sodium chloride and preferably between 480° and 620° C. while maintaining in the reactor an agitated non-adherent particulate bed of reaction products and thereafter recovering titanium from the said products, preferably after removal from the reaction vessel.

Following the reaction the titanium powder may be recovered immediately from the reaction product. We have, however, found it advantageous to submit the reaction products to a heat treatment in an inert atmosphere at a temperature above about 800° C. before recovering the metallic titanium.

Metallic titanium may be separated from the sodium chloride by a number of conventional methods as for example by extracting the sodium chloride with water or with an aqueous solution such as for example a 1% solution of sulphuric acid.

Alternatively, the reaction products may be heated to a temperature in excess of the melting point of titanium metal for example in an inert atmosphere arc melting furnace of known type whereby the sodium chloride is volatilized and the titanium metal removed in massive form.

Although the reaction between sodium and titanium tetrachloride will proceed at lower temperatures than 200° C. the reaction becomes slow at temperatures of the order of 150° C. possibly due to the formation of a coating of salt on the surface of the sodium particles which tends to inhibit the reactivity of the sodium. Furthermore, at these lower temperatures there is a tendency to incomplete reduction of titanium and even in the process according to the invention we find it advantageous to safeguard against the possibility of sub-chlorides being produced by employing an excess of sodium in the reduction process.

It must be understood that with any given reaction conditions (efficiency of stirring, heat control, rate of addition of reactants, etc.) there is an optimum temperature at which the reaction may be allowed to proceed. At higher temperatures than this there is a tendency for the bed to become sticky owing it is thought to local overheating.

In a preferred form of the invention the reduction process is initiated by the addition of the reactants, sodium and titanium tetrachloride to a stirred or fluidized bed of sodium chloride which may contain powdered titanium from a previous operation and once reaction takes place the reactants may be fed continuously. The product is then removed either continuously or from time to time conveniently by means of a gas stream or by mechanical means, suitably by means of a conveyor, and may be deposited in a hopper.

Fluidization of the bed may be maintained by employing any inert gas such as, for example, argon but when argon is used it is essential that the gas is free from oxygen or nitrogen to prevent a possible contamination of the products. To economize in the use of the inert gas it is desirable to re-circulate the gas through the bed. As an alternative to argon, hydrogen may be employed and in this case some titanium hydride is formed with the products of reaction. Subsequent degassing of the titanium hydride in a vacuum may be readily carried out to recover titanium metal.

Although the process in the fluidized bed may be carried out batchwise we prefer to operate a continuous process and as the reactants are added continuously to the fluidized bed so may the products of reaction, titanium metal and sodium chloride, be withdrawn. After withdrawal from the bed the products are heated to a temperature of approximately 850° C. to render the titanium less reactive. The metallic titanium may then be separated from the sodium chloride by any of the conventional methods e. g. by dissolving out the sodium chloride in water.

In carrying out the preferred continuous form of the process in a fluidized bed sodium is added to the bed at such a rate that the bed remains in the state of a fluidized solid and shows no indication of becoming pasty. For the production of titanium of a desirable quality it is also essential to avoid contamination with oxygen and we therefore prefer to employ sodium free from oxygen-containing contaminants. Such sodium may conveniently be added to the bed in a molten form after the impurities have been removed as, for example, by filtration.

We have found that under the specified conditions reaction between titanium tetrachloride and sodium is rapid even at low concentrations of tetrachloride in the inert gas employed. We have found it useful however to employ titanium tetrachloride vapour at a concentration of 5–10% by volume of the inert gas used.

The process of the invention may be operated with either of the reactants in excess but as previously stated it is advantageous to use a slight excess of sodium thereby avoiding the formation of subhalides which might result from interaction between excess titanium tetrachloride and finely divided titanium powder.

Too large an excess of sodium, however, increases the tendency for stickiness or caking to occur within the fluidized bed especially at temperatures approaching the melting point of sodium chloride and for this reason we find it advantageous to limit the quantity of free sodium present in the bed at any given time to about 1% by weight of the contents of the bed.

The fluidized bed may be operated at any temperatures between 200° and temperatures approaching the melting point of sodium chloride but advantageously the temperature of the bed is maintained between 480° C. and 620° C. At this temperature caking of the fluidized bed due to local overheating is avoided and at the same time this temperature is sufficiently high to ensure that the reaction is complete without any tendency for sub-halides to be formed provided that an excess of sodium is present.

As the reaction between sodium and titanium tetrachloride is accompanied by the evolution of a considerable quantity of heat it is desirable to introduce a system of temperature control. This can be accomplished to some extent by varying the concentration of the titanium chloride in the inert gas but for commercial practice it is advantageous to provide a means for withdrawing heat from the fluidized bed. This can be effected by circulating a coolant fluid through a heat transfer system located either within or without the reaction vessel, suitably by means of cooling coils. It is not advisable, however, to use an aqueous coolant fluid as any leakages that are likely to occur may have disastrous effects when working with sodium as one of the reactants. To some extent similar objections apply with an oxygen containing gas such as air. Suitable coolants for the purpose are oil or boiling titanium tetrachloride but we prefer to employ liquid sodium, potassium or sodium-potassium alloy on account of their high heat transfer coefficients.

Many advantages result from carrying out the reduction process in a fluidized bed. In the first place metallic titanium is produced in an easy and continuous operation and the reaction products are conveniently handled without the employment of moving mechanical parts. It is also possible by this method to effect a very efficient utilisation of the raw materials.

The following examples illustrate but do not limit our invention:

Example 1

The apparatus employed in this example is illustrated in the attached drawings by Figure 1 to which reference will now be made.

The reaction vessel 1 consisted of a gas tight mild steel pot fitted with a mild steel stirrer 2 whose shaft passed through a gas tight seal 3 in the vessel lid 4.

The vessel lid also carried pipes for the separate delivery of argon 5, sodium 6 and titanium tetrachloride 7 into the interior of the vessel above the stirred bed 8; the sodium pipe was fitted in the rodding device 9 to clear blockages.

The vessel was fitted with a run off cock 10 on the bottom which discharged into a mild steel pot (not shown) maintained under an atmosphere of argon.

The reaction vessel was about half filled with powdered sodium chloride, free from objectionable impurities such as oxygen or nitrogen, and the air in the vessel replaced with argon admitted through pipe 5.

The vessel contents were then heated by applying heat to the mild steel vessel until a temperature of approximately 500° C. was attained in the bed. Stirring was carried out throughout the heating operation in order to obtain a uniform temperature in the bed.

When the temperature had reached 500° C. heating was stopped, and molten sodium metal, which had been previously filtered through steel wool to remove sodium oxides and other filterable impurities, was introduced into the vessel through pipe 6 at a temperature of approximately 150° C. at an average rate of 1.5 lb. per hour per square foot cross section of the bed. Simultaneously, liquid titanium tetrachloride at 20° C. was introduced into the vessel through pipe 7 at such a rate that slightly less than one molecular part of titanium tetrachloride was added for every four molecular parts of sodium.

The sodium and the titanium tetrachloride reacted with evolution of heat to give titanium metal and sodium chloride, and the rate of addition was so limited that the temperature of the bed was maintained around 500° C., excess heat being lost by radiation; reaction appeared to be complete and there was no indication of the formation of titanium subhalides.

It was found to be desirable to maintain a steady rate of sodium addition once the reaction had started, as titanium metal tended to be formed on the end of the feed pipe if the flow of sodium was stopped for a time. Such blockages were readily cleared by the rodding device 9 which was fitted to the sodium feed tube 6.

No difficulty was experienced during the reaction from caking of the bed which remained in a powdery form even when the sodium content of the bed rose to about 1%.

As the mass of the reacted products accumulated it was necessary to remove some of the mixture from time to time, taking care to leave enough to provide a satisfactory stirred bed for carrying on the reaction.

This product which was substantially free from subhalides of titanium, was then transferred to a mild steel vessel and heated under argon to about 850° C. for 1 hour in order to render the titanium metal less reactive.

The fused salt and titanium mixture was then allowed to cool and the mixture removed by mechanical means from the mild steel container. Water was then added to the mixed product and the sodium chloride extracted. The titanium metal powder which remained was finally dried and found to contain 99.5% of titanium.

Example 2

Figure 2:
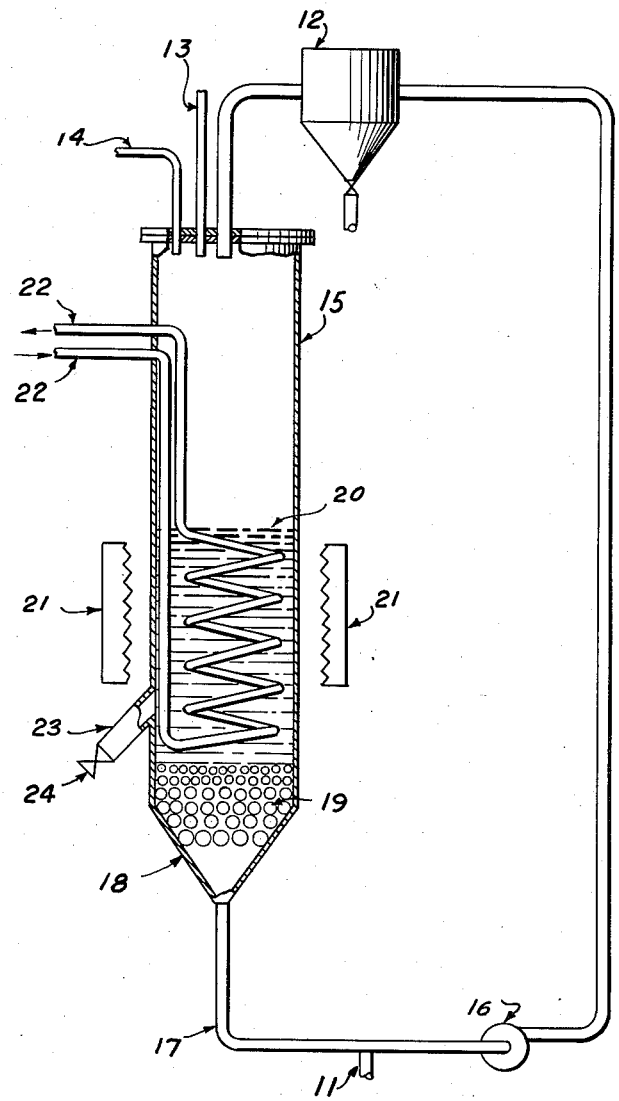

The apparatus employed in this example is illustrated in the attached drawings by Figure 2 to which reference will now be made.

The apparatus in which reaction was carried out consisted of a mild steel fluidizing vessel 15 through which it was possible to circulate argon by means of a blower 16, the entire system being kept under a slight positive pressure to avoid the ingress of air.

The argon from the blower delivery discharged through a mild steel pipe 17 into the bottom of the fluidizing vessel. The cylinder was tapered at the bottom to facilitate the building up of the distributor which consisted of a mild steel grid 18 covered with a graded layer of stainless steel balls 19 diminishing in size from about ½" diameter at the bottom to 1/32" diameter at the top. The steel balls supported a bed of finely divided reaction product 20, from a previous run. The cylinder was provided with external heating means 21, while removal of heat after the reaction had started could be effected by means of a cooling coil 22, through which air was blown. A run off pipe set at an angle of 45° in the cylinder wall 23 and closed by means of a suitable valve 24, discharged into a hopper (not shown) which was maintained under an argon atmosphere and permitted the withdrawal of the reaction products when required.

Titanium tetrachloride vapour was introduced into the circulating gas at a point between the blower delivery and the inlet to the cylinder below the distributor at 11. The exit gas, after leaving the cylinder passed through a dust trap 12. The exit gas then passed on into the blower inlet. The lid of the fluidizing vessel was also fitted with an inlet pipe 13 through which filtered molten sodium could be admitted at a controlled rate.

The lid also carried a separate pipe 14, for the induction of argon.

A bed consisting of 1 part by weight of titanium powder and 5 parts by weight of sodium chloride, which has been prepared in a previous run and which was free from oxygen and nitrogen, was fluidized by means of circulating argon. A linear gas velocity of about ½ ft. per second was used. When the bed was fluidizing in a satisfactory manner, heat was applied to the vessel until the bed temperature was approximately 600° C. after which the heating was shut off.

Sodium was then allowed to run on to the bed when it was found to disperse on the fluidized particles. Before the sodium content of the bed had reached 1%, titanium tetrachloride vapour was introduced into the circulating gas until a concentration of about 5% titanium tetrachloride by volume was obtained at the point of entry to the fluidised bed.

The sodium and tetrachloride additions were so adjusted that they corresponded approximately to the stoichiometric proportions required for the complete reduction of the tetrachloride. Once the reaction had started it was necessary to remove excess heat from the bed and the air cooling system was accordingly put into operation.

It was found that the sodium and the titanium tetrachloride reacted very readily, and by maintaining a very slight excess of sodium it was possible to avoid the formation of titanium sub-halides. As the reaction proceeded the fluized bed increased in bulk and it was necessary to tap off the excess product from time to time.

Before exposure to the air, the product was heated at about 850° C. for 1 hours under argon in order to render the titanium powder less reactive, after which it was recovered by removal of the salt by extracting with water. The final powder on arc melting was converted to a massive titanium of 220 V. P. N.

What I claim is:

1. A process for the manufacture of metallic titanium which comprises providing an agitated, non-adherent particulate solids bed comprising primarily sodium chloride in an inert atmosphere, reacting sodium and titanium tetrachloride by introducing same into said bed while the later has a temperature between 200° C. and the melting point of sodium chloride, the resulting reaction mixture, including the reaction products and any remaining reactants, being maintained in said agitated, non-adherent particulate solids form throughout said reaction, and thereafter recovering titanium from the resulting mixture.

2. The process of claim 1 wherein said bed is maintained at a temperature of 480 to 620° C. during said reaction.

3. The process of claim 1 wherein the reactants are added continuously to said bed and a portion of the resulting reaction mixture is continuously withdrawn for recovery of the titanium therein.

4. The process of claim 1 wherein the resulting reaction mixture is heated after said reaction at a temperature in excess of 800° C. and the titanium is thereafter recovered by separating same from the thus heat-treated reaction mixture.

5. The process of claim 4 wherein the resulting reaction mixture is heated after said reaction to a temperature above the melting point of titanium.

6. The process of claim 1 wherein said bed and the resulting reaction mixture are in the fluidized state.

7. The process of claim 6 wherein the titanium tetrachloride is added to said bed with an insert fluidizing gas.

8. A process according to claim 7 in which the proportion of titanium tetrachloride to inert gas admitted to the bed is 5% to 10%, by volume of that of the gas employed.

9. The process of claim 1 wherein said bed includes powdered titanium from a previous operation.

10. The process of claim 1 wherein the temperature of said bed is maintained within the range stated by cooling.

11. The process of claim 10 wherein said cooling is effected by means of a coolant selected from the group consisting of liquid sodium, potassium and sodium-potassium alloy.

12. A process according to claim 1 in which sodium is used in excess of the stoichiometric quantity required to give complete reduction of titanium tetrachloride and the free sodium present in the bed at any given time constitutes approximately 1% by weight of the contents of the bed.

13. A process for the manufacture of metallic titanium which comprises providing an agitated, non-adherent particulate solids bed comprising primarily sodium chloride in an inert atmosphere, reacting sodium and titanium tetrachloride by introducing same into said bed while the latter has a temperature between 200° C. and the melting point of sodium chloride, the resulting reaction mixture, including the reaction products, being maintained in said agitated, non-adherent particulate solids form throughout said reaction, and thereafter recovering titanium from the resulting mixture.

References Cited in the file of this patent

UNITED STATES PATENTS

| Number | Name | Date |
|---|---|---|
| 2,148,345 | Freudenberg | Feb. 21, 1939 |
| 2,462,661 | Munday | Feb. 22, 1949 |
| 2,478,912 | Garbo | Aug. 16, 1949 |
| 2,560,175 | Kalbach | July 10, 1951 |
| 2,596,072 | Graham et al. | May 6, 1952 |
| 2,618,549 | Glasser et al. | Nov. 18, 1952 |
| 2,618,550 | Hampel et al. | Nov. 18, 1952 |
| 2,621,121 | Winter | Dec. 9, 1952 |

FOREIGN PATENTS

| Number | Country | Date |
|---|---|---|
| 296,867 | Germany | Mar. 13, 1917 |
| 386,621 | Great Britain | Feb. 16, 1933 |